United States Patent [19]

Stark

[11] Patent Number: 5,671,344
[45] Date of Patent: Sep. 23, 1997

[54] PROCESS FOR DISPLAYING N DIMENSIONAL DATA IN AN N-1 DIMENSIONAL FORMAT

[75] Inventor: Tracy J. Stark, Houston, Tex.

[73] Assignee: Exxon Production Research Company, Houston, Tex.

[21] Appl. No.: 588,827

[22] Filed: Jan. 19, 1996

Related U.S. Application Data

[63] Continuation of Ser. No. 675,690, Mar. 27, 1991, abandoned.

[51] Int. Cl.$^6$ .............................. G06F 15/00; G01V 1/00
[52] U.S. Cl. ..................... 395/119; 395/326; 364/223.9; 367/68; 367/71; 367/72; 367/73
[58] Field of Search .................................. 367/68, 70, 72, 367/73, 74; 395/119, 141, 326; 364/223.9, 223.8

[56] References Cited

U.S. PATENT DOCUMENTS

| | | | |
|---|---|---|---|
| 4,661,935 | 4/1987 | Shock et al. | 367/70 |
| 4,679,174 | 7/1987 | Gelfand | 367/73 |
| 4,868,883 | 9/1989 | Chen | 582/109 |
| 4,964,098 | 10/1990 | Horabostel | 367/73 |
| 4,984,220 | 1/1991 | Bodine et al. | 367/68 |
| 5,018,112 | 5/1991 | Pinkerton et al. | 367/72 |

OTHER PUBLICATIONS

"FEMvis: An interactive visualization tool for Mechanical analysis", G. P. Bala; IBM J. Res. Develop; vol. 35, No. 1/2 Jan/Mar 1991, pp. 4–11.

Gerhardstein, Anthony et al. "Interactive Interpretation of Seismic data", 52nd Annual Inter. SEG meeting, Oct. 17, 1982.

Crystal Interactive Graphic System Brochure, Western Geographical, 1983.

Cheng, Y. And Lu, S., "The Binary Consistency Checking Scheme and Its Applications to Seismic Horizon Detection," IEEE Transactions in Pattern Analysis and Machine Intelligence, vol. 17, No. 4, Apr. 1989.

Lu, S., "A String–to–String Correlation Algorithm for Image Skeletonization," 6th International Conference on Pattern Recognition, Munich, Germany, Oct. 19–22, 1982.

Brown, Alistair R., Interpretation of Three–Dimensional Seismic Data Second Edition, American Association of Petroleum Geologists, Oklahoma, 1988, Chap. 3.

Brown, Alistari R., "Structural Interpretation from Horizontal Seismic Sections" Society of Exploration Geophysicists 52nd Annual Meeting, Oct. 1982.

(List continued on next page.)

*Primary Examiner*—Mark R. Powell

[57] ABSTRACT

A process for generating a surface slice for use in understanding or comprehending the internal structure of a multi-dimensional data volume and specifically a three-dimensional seismic data volume. The surface slice is a local N-1 dimensional representation of the internal structure of N dimensional data, where N represents the original dimension of the data volume. Information from the Nth-dimension is preserved in the N-1 dimensional surface slices. An arbitrary surface intersecting surfaces through the data volume is selected. A variant, an identifiable attribute of data which forms the surfaces of finite extent throughout the data volume, is also selected and isolated to identify the surface. Variants can include, but are not limited to, peaks, troughs, local peaks, local troughs, plus-to-minus zero crossings, and minus-to-plus zero crossings. Isolated variants from the arbitrary surface are combined into the arbitrary surface with isolated variants surrounding the arbitrary surface to create the surface slice. Isolated variants identified by their position in the data volume generate a time surface slice. Both quantitative and qualitative information on the local strike, local dip direction and dip magnitude of the intersecting surface are present. Isolated variants identified in any other manner generate an amplitude surface slice presenting both quantitative and qualitative information on the local strike and dip magnitude of the intersecting surface.

81 Claims, 11 Drawing Sheets

OTHER PUBLICATIONS

Crystal Interactive Graphic System Brochure, Western Geophysical, 1983.

Gerhardstein, Anthony C. and Brown, Alistair R., "Interactive Interpretation of Seismic Data", 52nd Annual International SEG Meeting, Oct. 17, 1982.

Landmark Geophysical Solutions Brochure, TurboZAP, 1990.

McQuillin, R. et al., An Introduction to Seismic Interpretation, Gulf Publishing Company, 1984, Chapter 6.

Miller, Palle F., "GECO's Interactive Interpretation Work Station", CSEG 1983 National Convention, Apr. 1983.

Schneider, William A., "Developments in Seismic Data Processing and Analysis (1968–1970)", Geophysics, Dec. 1971, vol. 36, No. 6, pp. 1043–1073.

Sonneland, Lars, "Computer Aided Interpretation of Seismic Data", European Association of Exploration Geophysicists 45 Annual Meeting, Jun. 1983.

PROCESS FOR DISPLAYING N DIMENSIONAL DATA IN AN N-1 DIMENSIONAL FORMAT

This application is a continuation of application Ser. No. 07/675,690, filed on Mar. 27, 1991, abandoned.

BACKGROUND OF THE INVENTION

1. Field of the Invention

This invention pertains to a process useful in understanding or comprehending the internal structure of a multi-dimensional data volume. The method takes N-dimensional data, where N represents the data dimension, and represents it in a N-1 dimensional format while keeping important information on the reduced dimension.

2. Description of the Prior Art

There are many fields in which multi-dimensional data are important. For instance, practitioners in the seismic exploration field utilize three-dimensional data gathered at the surface to determine the structure and infer the properties of the subsurface. Practitioners in the medical field also utilize three-dimensional data to identify abnormalities in the body. Molecular chemists and biologists use super computers to model and understand the interactions of molecules in space and time.

It is highly desirable to obtain not only a qualitative, but also a quantitative understanding and description of the internal structure of such data volumes. For example, in the case of three-dimensional seismic data, accurate structural information is required for the proper and optimum placement of wells. Achieving a high level of accuracy is imperative to the success of the exploration. This structural information is required for several geologic horizons that occur within the bounds of the three-dimensional data volume.

The extraction of such structural and other information from three-dimensional seismic data is presently costly and time consuming. In addition, the present techniques are ineffective in extracting all of the information available from the data volume. To some extent, the more time spent interpreting the data the greater will be the improvement on the accuracy and reliability of the interpretation. However, extra time is generally not available due to the increase in costs and exterior deadline considerations. Also, the effectiveness of present interpretation processes is only slightly improved by spending more time on a project. A typical method or process of extracting information presently in use is the seismic interpretation procedure described in *AAPG Memoir 42, Interpretations of Three-Dimensional Seismic Data*, a publication of American Association of Petroleum Geologists, Oklahoma, published in 1988, Alistair R. Brown.

Contour maps are commonly used to represent the internal structure once the information is extracted from the three-dimensional data by seismic interpretation. These maps show areas having the same elevation (or elevation range). As a result, contour maps contain both qualitative and quantitative information on the strike and dip of the particular internal structures. These particular structures are normally referred to as horizons. The combination of strike and dip of a horizon on a single display, exhibits the three-dimensional information in a two-dimensional format.

The strike of a horizon is defined by the line which results from the intersection of the horizon and a horizontal plane. The strike of a horizon will vary with position and with the depth or elevation of the horizontal plane.

The true dip of a horizon is defined by the local perpendicular to the strike. Dip has both a direction and a magnitude. The dip direction is the direction in which the horizon gets deeper. The dip magnitude is the angle the horizon makes with the horizontal plane as measured in the dip direction. The dip direction and magnitude can vary with both position and depth. The apparent dip magnitude is what is measured in some direction other than the true dip direction and is always less than the true dip magnitude.

True dip and strike demonstrate how the horizon varies structually through the data volumes. Extracting the true dip and strike of a horizon by seismic interpretation is a very costly and time consuming process because of the present seismic interpretation techniques. Generally, structural and stratigraphic information is obtained from seismic data by identifying particular seismic events of interest, and trying to follow these events throughout the three-dimensional data volume.

A seismic event is typically made up of only one type of variant. In the current context, a variant is any identifiable and isolatable attribute of the data which forms a surface of some finite extent throughout the data volume. Some examples of variant types are, but not limited to, peaks, troughs, zero crossings and values of constant instantaneous phase.

The most common manner in which multi-dimensional data are studied and interpreted is to display the data values that are found at the intersection of a two-dimensional plane with the data volume. These displays are common primarily because the original display medium was paper. CRT screens are now a popular medium. However, these displays only contain data present on that particular plane. No information or data from the adjacent planes are represented. These displays do not even contain qualitative information on how the data varies in the other dimensions.

To understand how the data volume varies in a dimension at an angle to the plane of the representation, many such displays must be generated by moving the two dimensional plane through the data volume. Typically these planes are defined by constant positions along all but two of the data dimensions.

In the case of three-dimensional seismic data, there are three typical two-dimensional display planes. These planes are parallel to each of the three data dimensions. There are two vertical planes and one horizontal plane.

Only the apparent dip direction and magnitude of reflection horizons can be determined by interpreting a single vertical plane. The true dip direction and magnitude cannot be determined from a single display, since these displays contain no information on the strike of the event. Interpretations from several adjacent and/or intersecting vertical planes can be combined to obtain the true strike and dip of the interpreted horizons. The horizons must be interpreted before any information on the true strike and dip can be obtained.

An estimate of the strike of reflection horizons can be determined by interpreting a single horizontal display. Only the true strike of zero crossings can be determined from a single horizontal plane. No dip information is present on such a display. Several horizontal planes must be interpreted to obtain any information on the dip of the horizons.

Another method of displaying multi-dimensional data is to display two or more planes oriented at some angle with respect to the other. Normally the planes are at right angles to each other and displayed in a single two-dimensional display. These displays provide some information on the internal structure variations within the data cube, by showing the structure on faces of the cube. However, this information is only speculative at best. These displays are sometimes called fence diagrams, block diagrams, perspective views, or chair diagrams.

Another technique is to color code two or more parallel planes according to their differential position and display them on a single two-dimensional plane (Brown 1988, ibid.). For example, all positive amplitude values existing on a single plane may be represented in black. For a plane somewhat lower, the positive values are represented by a different color such as blue. Negative values are represented with yet a different contrasting color, such as white or clear. These two planes are then combined to show the relative position of the positive values with respect to two way travel time. Some strike and dip information is present in this two-dimensional display. However, these types of displays do not isolate a particular type of variant, nor do they provide quantitative dip information.

A fourth display technique uses a thresholding routine to display the data in an isometric or perspective view. Only amplitude or data parameters that fall within a particular value range are displayed. Again, these methods do not allow for the quantitative extraction of the particular data variants used in interpreting the internal structure of the data volumes.

A final method is to pick a particular type of variant and display its location only if it can somehow be hooked up to an adjoining variant as discussed in the article written by William Schneider entitled "Developments in Seismic Data Processing and Analysis (1969–1970)", published in 1971 in *Geophysics*, Volume 36, number 6, pages 1043–1073. These displays have not been used in multidimensional applications and require some sort of match or hooking to variants on adjacent traces.

Interpretation techniques in the prior art require isolation of a particular variant type to obtain quantitative strike and dip information such as that contained in contour maps. Even though the display techniques previously mentioned provided some information useful for interpretation, actual interpretation must still be done on the data. The interpretation is typically done by a human interpreter, but it is also sometimes done (though not too well) automatically with computer programs. It was not previously recognized that quantitative strike and dip information could be obtained in a single display without first doing some type of interpretation, either by a human or by a machine.

Therefore, it is a feature of the present invention to provide a local N-1 dimensional representation of N-dimensional data highlighting the internal structure of the data.

It is another feature of the present invention to provide qualitative information on changes in the dip magnitude and in some instances dip direction of surfaces present in an N-dimensional data set, which can in turn be used to derive the respective quantitative information on dip magnitude and dip direction.

It is still another feature of the present invention to provide detailed information on the strike direction in a single display.

It is still another feature of the present invention to provide in a single two-dimensional display both strike and dip information including dip magnitude and in some instances dip direction.

It is still another feature of the present invention provide a display isolating a particular type of variant such as a peak or trough, instead of a continuum of variants.

It is yet another feature of the present invention to generate useful information on structures within a multi-dimensional data set without having to undergo prior interpretation either by a human or some computer algorithm.

It is still another feature of the present invention to provide a technique to display isolated portions of desired structures within a multi-dimensional data set.

It is still another feature of the present invention to provide a local two-dimensional representation of three-dimensional seismic data.

SUMMARY OF THE INVENTION

The process described herein comprises a method for generating qualitative and quantitative information on local internal structures within a multi-dimensional data set without requiring or utilizing interpretation procedures. Multi-dimensional data of N dimensions is represented locally in a N-1 dimensional format on what is herein called a surface slice. Variants are isolated on an N-1 dimensional surface and combined with other isolated variants surrounding such surface to generate the surface slice. The surface slice contains N dimensional information on structures intersecting the N-1 dimensional surface. The process of identifying and isolating all occurrences of a variant and combining them on to N-1 surfaces provides both quantitative and qualitative information on both the strike and dip of such structures.

Surface slices contain different information depending on the variant selected and the manner in which the variant is represented on the surface slice. If the variant is represented by its amplitude, then an amplitude surface slice is generated providing both the strike and dip magnitude of the intersecting surfaces. If the variant is represented by its relative position in the data set, for instance by its position in time, then a time surface slice is generated. In addition to containing both strike and dip magnitude information, a time surface slice also provides the dip direction information.

Once a surface slice is generated it can be displayed in a number of ways. For instance, variations in time or amplitude can be differently depicted by colors or shading to show the resulting information.

BRIEF DESCRIPTION OF THE DRAWINGS

The file of this patent contains at least one drawing executed in color. Copies of this patent with color drawing(s) will be provided by the Patent and Trademark Office upon request and payment of necessary fee.

So that the manner in which the above-recited features, advantages and objects of the invention, as well as others which will become apparent, are attained and can be understood in detail, more particularly description of the invention briefly summarized above may be had by reference to the embodiments thereof that are illustrated in the drawings, which drawings form a part of the specification. It is to be noted, however, that the appended drawings illustrate only preferred embodiments of the invention and are, therefore, not to be considered limiting of its scope for the invention may admit to other equally effective embodiments.

In the drawings:

FIG. 1 is a representation of a single planar surface within a three-dimensional data volume.

FIG. 2 is a three-dimensional representation of seismic data for a given area in accordance with the preferred embodiment of this invention.

FIGS. 3A–3B show graphical two-dimensional representations of a time surface slice and an amplitude surface slice in accordance with this invention.

FIG. 4 is a two-dimensional graphical representation of two horizons of two different dips.

FIGS. 5A–5C show the flow diagrams illustrating three preferred embodiments of this invention.

FIG. 6 is a representation of a single seismic trace for a given location.

FIG. 7 is a diagram showing various ways in which to represent the variant existence in accordance with this invention.

FIG. 8 represents a three-dimensional data volume including a non-planar dipping plane with adjacent similarly configured arbitrary surfaces.

FIG. 9 represents a three-dimensional data volume showing distance from a non-planar dipping plane.

FIGS. 10A–10B show a time surface slice and an amplitude surface slice generated from conventional data illustrating a preferred embodiment of this invention.

DESCRIPTION OF THE PREFERRED EMBODIMENTS

In order to display three-dimensional data in a graphical format, it is common to show data from intersecting orthogonal planes. Since a CRT screen or a sheet of paper is essentially flat or two-dimensional, when orthogonal planes of data are presented thereon to give a three-dimensional impression to the viewer, an isometric view is graphically displayed wherein the data in a first plane is shown in the front plane (plane of the screen or paper) of an isometric "block" and the data in the second plane is shown in a side-angle plane of this same block. By having additional planes of data parallel with one or both of these first and second planes, then data points can be plotted for the top plane of the block. Of course, other planes parallel with the top plane could also be developed so as to yield additional three-dimensional graphical displays.

There is a certain amount of distortion in the presentation that has just been described since the side and top views are at angles to the front plane. Furthermore, to really show three-dimensional data accurately takes a series of views, not just a single view that shows the data only on three planar surfaces of a three-dimensional block. For three dimensional data to be graphically displayed in a true two-dimensional format, a method must be provided to convert or reduce the three-dimensional data to two-dimensional data while retaining the three-dimensional information. In the general case, the method hereinafter described locally converts or reduces N dimensional data to N-1 dimensional data for display or other purposes. The preferred embodiment of this invention addresses the local reduction of three-dimensional data to two-dimensional data preserving important aspects of the three-dimensional content of the original.

Figure 1:
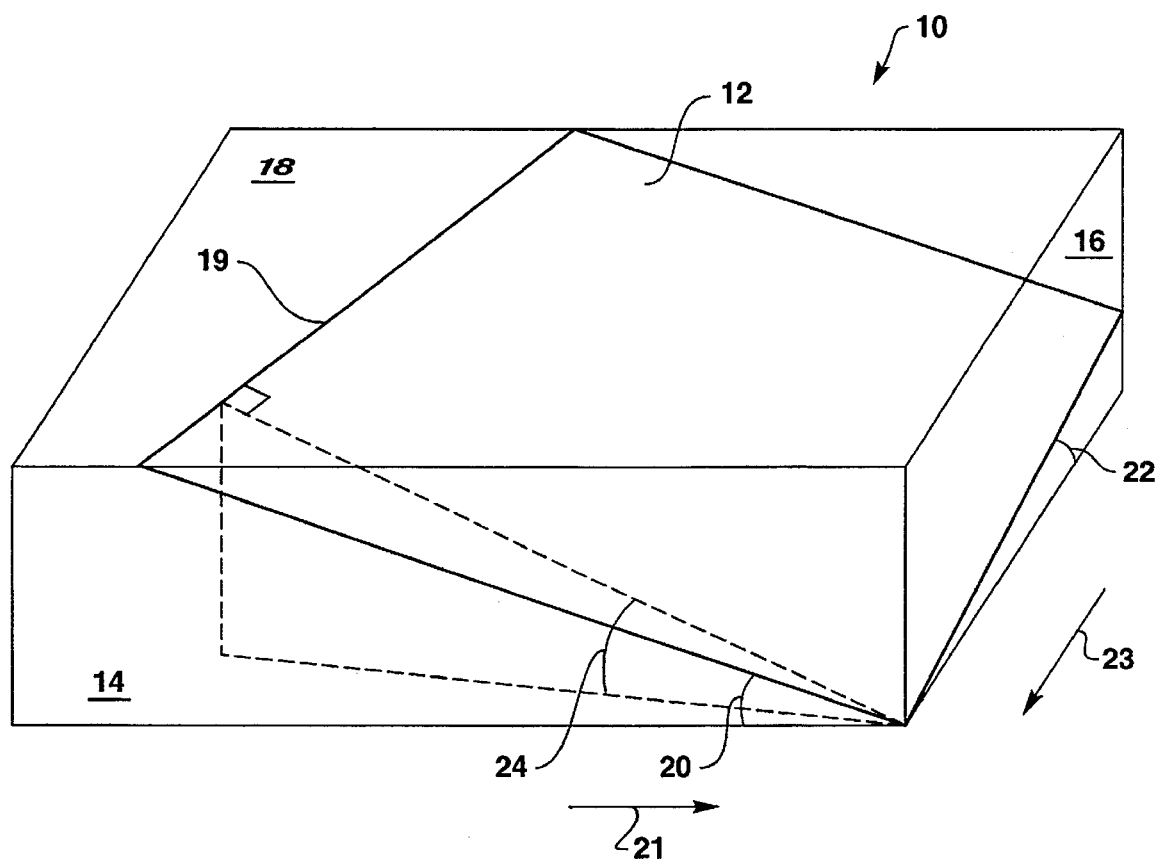

Now referring to the drawings, and first to FIG. 1, a three-dimensional data volume 10 containing a single dipping plane 12, is illustrated. Apparent dip directions 21 and 23 and apparent dip magnitudes 20 and 22 of dipping plane 12 are shown respectively on either one of the two visible vertical faces 14 and 16. Any single vertical face of this volume will present only apparent dip direction and dip magnitude. A single vertical face will not include any information on the strike of the dipping plane 12 nor the true dip magnitude 24. A single horizontal face, such as face 18, shows the strike 19 of plane 12 but does not provide any dip information.

A single face of a three dimensional data volume does not provide both strike and dip of a plane that is located within the data volume. The true strike and true dip of a plane can be determined from any two faces through the data volume, provided (1) the same dipping plane is properly identified on both faces and (2) the angle between the two faces is known when they are not parallel or their separation is known when they are parallel.

This invention provides a method to obtain strike and dip information, including dip magnitude and in some instances dip direction, all in a single two-dimensional display, hereinafter referred to as a surface slice.

Figure 2:
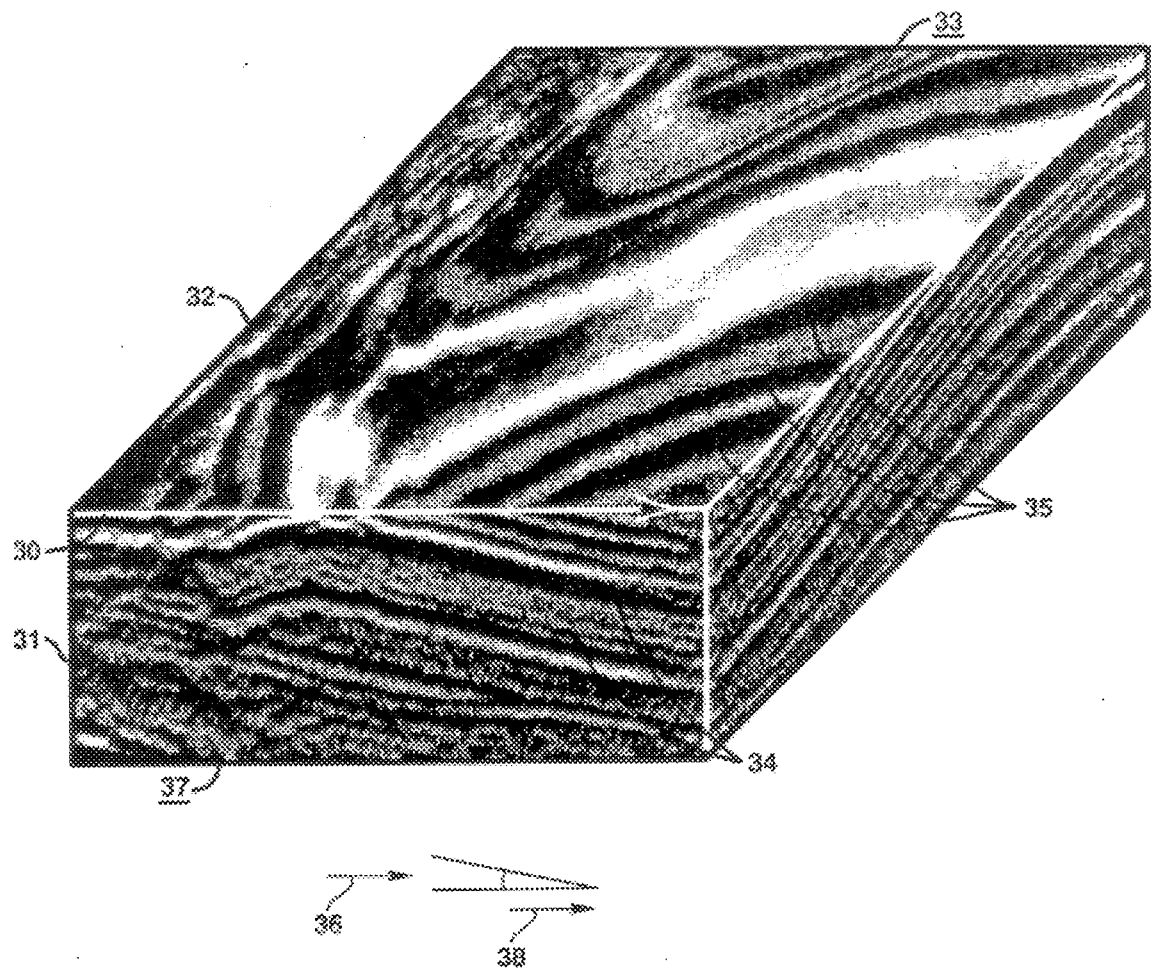

This invention is particularly useful in analyzing three-dimensional seismic data. FIG. 2 shows a portion of a three-dimensional seismic data volume. Data located along the x-axis 30 represents data collected for a specified distance in the x-direction. Data located along the y-axis 32 represents data collected for a specified distance in the y direction. The x and y axes are normally orthogonal and represent the relative geographic locations of the data points. Data located along the z-axis 31 represents the two way travel time down into the subsurface and back that a seismic signal has traveled. The z axis is normally represented as orthogonal to both the x and y axes.

Dipping seismic reflection horizons 34 are apparent on the vertical side 37 of the volume. Only apparent dip magnitude 36 and apparent dip direction 38 are extractable from a single vertical side. Horizontal plane 33 through the volume provides the approximate strike of the dipping seismic reflection horizons 35 which intersect this plane. No dip information exists on this single horizontal plane.

A surface slice contains more information about the dipping horizons than a single horizontal or vertical plane. For instance, information from the data surrounding a horizontal or vertical plane, is combined and represented on the plane. The type of information provided depends on how the data are represented on the surface slice. The ultimate result is a two-dimensional representation of data from three dimensions.

Figure 3A:
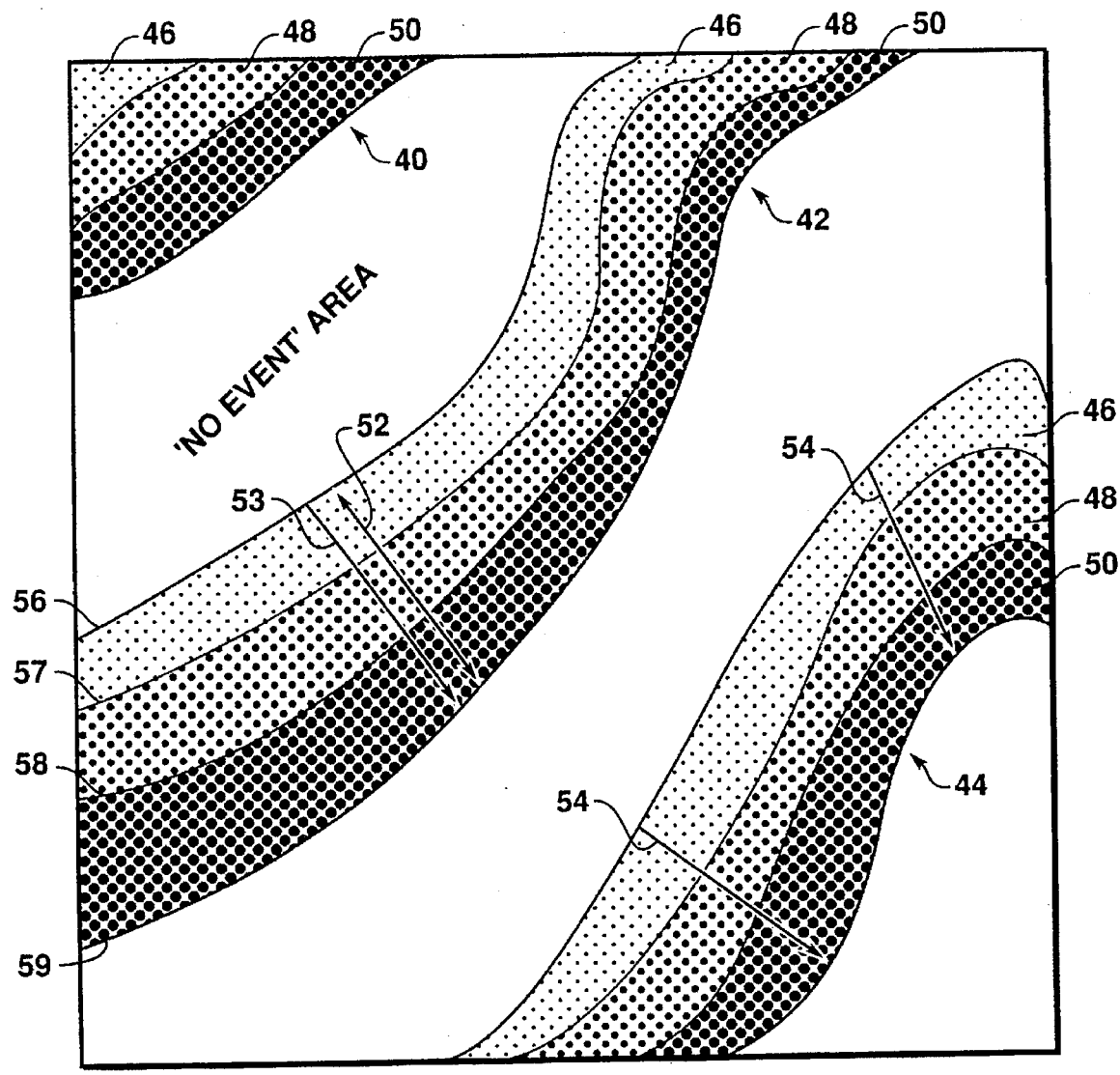
Figure 3B:
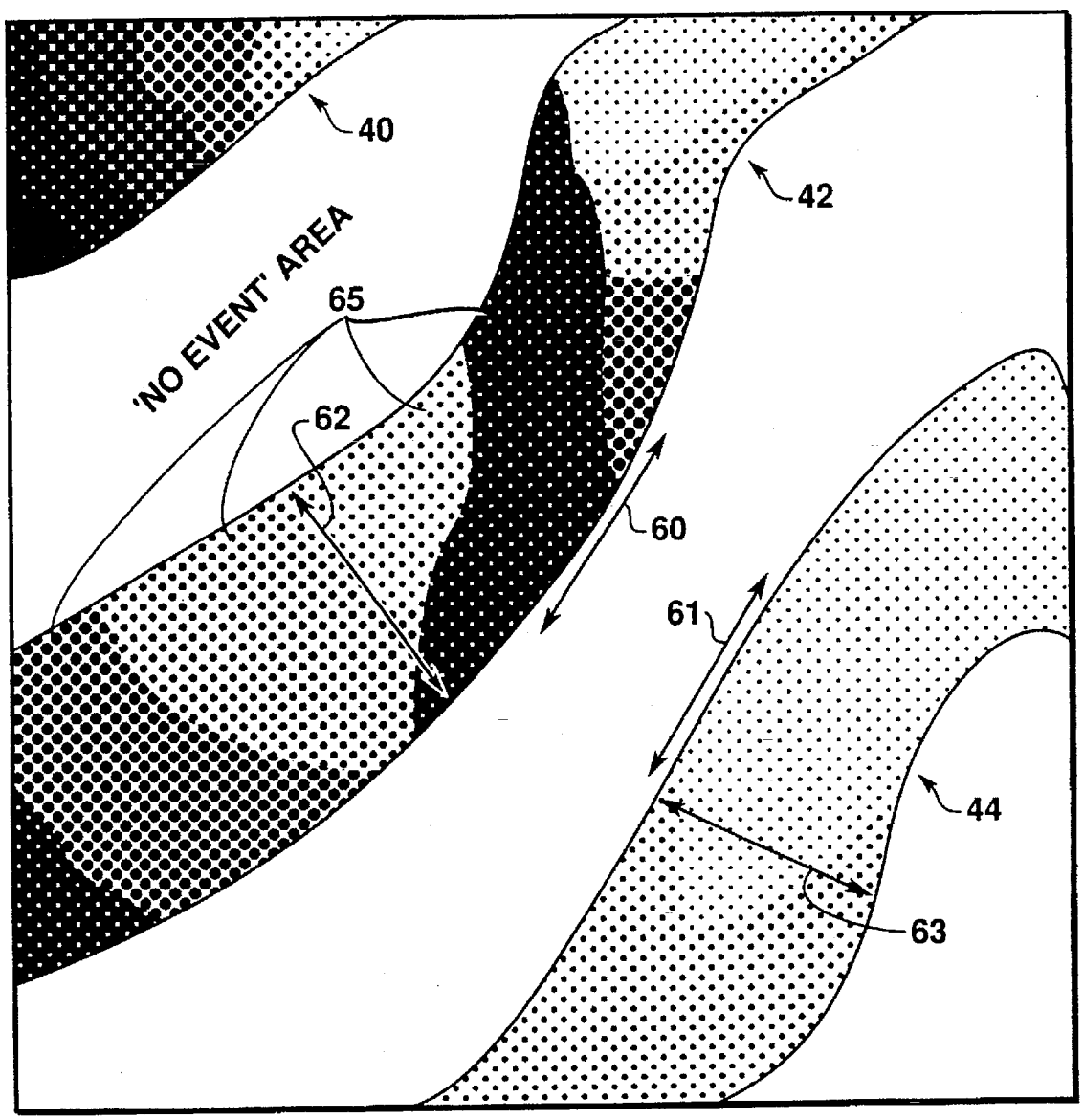

This invention provides methods for generating a plurality of surface slices. FIGS. 3A and 3B represent two different kinds of surface slices that can be generated. A time surface slice is shown in FIG. 3A and an amplitude surface slice is shown in FIG. 3B. Both kinds of surface slices can be generated from a three-dimensional data volume such as the seismic data shown in FIG. 2. Three dipping surfaces 40, 42, and 44 that exist in the data volume and intersect the surface slices are shown in both FIGS. 3A and 3B. Both surfaces slices contain strike and dip information for the three dipping surfaces 40, 42, and 44.

Surface slices contain the locations of where surfaces of a particular variant do and do not exist within the thickness of the slice. The areas over which the surfaces do not exist are called "no-event" areas. The areas where the surfaces do exist are represented such that they contain information on both the strike and dip of these surfaces.

The time surface slice, FIG. 3A, contains several time contours 46, 48, and 50 which represent data from different two-way travel times present in the three-dimensional data volume from which the surface slice was generated. The number of contours per display is display-generation dependent and equals the thickness of the slice and the contour interval. The contours show where surfaces or horizons 40, 42, and 44 exist and how they vary within the few-contours-thick slice and, therefore, show local strike, dip direction, and dip magnitude.

The dip direction is determined by the direction in which the time contours 46, 48, and 50 change. For example, the dip directions 53 and 54 of horizons 42 and 44, respectively, is toward the bottom right hand corner of the surface slice assuming time 50 is greater than time 46.

The local strike of a horizon is defined as the tangent to the line formed by the intersection of the horizon and a horizontal plane. For example, in FIG. 3A, the time boundaries 56, 57, 58 and 59 of time contours 46, 48, and 50 are such intersections. Therefore, FIG. 3A has information on how the strike changes with horizon, travel time, and position. This is exhibited by the changes in the tangent to the contour boundaries 56, 57, 58 and 59.

The dip magnitude of each horizon is proportional to the thickness of the slice in time and the width of the event existence representation which is depicted by, for instance, the length of line 52. The local changes in the width of the individual time contours 46, 48 and 50, provide details of the changing dip magnitude. The significance of the width measurement is illustrated in FIG. 4.

Figure 4:
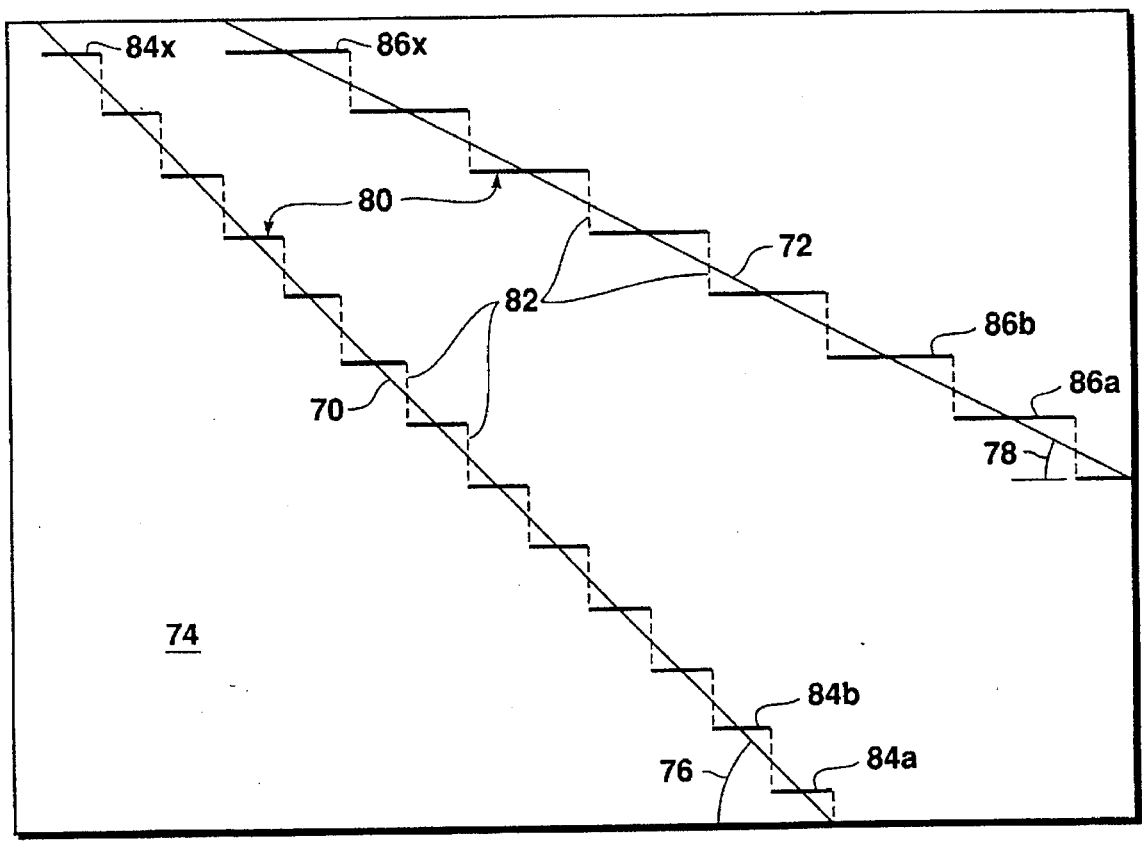

FIG. 4 shows two horizons 70 and 72, intersecting vertical plane 74, which is illustrated as the plane of the paper. The angle 76, horizon 70 makes with a horizontal plane is about twice as large as the angle 78, horizon 72 makes with a horizontal plane indicating horizon 70 has an apparent dip which is almost twice as steep as the apparent dip of horizon 72.

When these two horizons are equally sampled in the vertical direction, their locations are represented to the nearest sample. This vertical sampling results in the stair step representations 80 of the horizons. The number of steps is proportional to the sample rate and the length of the horizon. The height of each step 82 is constant, equal to the distance between the samples, and independent of dip. The width of each sample is dependent upon the dip magnitude and thus proportional to the angle the horizon makes with the horizontal and the height of each step. In this case, the width 84a, 84b ... 84x of the steeper horizon 70 is exactly one half the width 86a, 86b ... 86x of the other horizon 72.

With conventional seismic data the sample rate is constant and known for a particular data set, and therefore the width of the stair step is always proportional to the dip of the horizon. The narrower the steps, the steeper the horizon. In FIG. 4, the tangent of the dip angle equals the thickness of the slice (or time samples) divided by the width of the stair step.

FIG. 4 also illustrates the nature of the time contour boundaries of FIG. 3a. These boundaries are represented by the edges of the steps in FIG. 4. These steps always begin and end halfway between the sample points. The fact that they occur at a constant time, is the reason these contour boundaries can be used to accurately determine the strike direction.

Referring back to FIG. 3B, the amplitude surface slice contains local strike 60 and 61 and dip magnitudes 62 and 63 for each of the horizons 42 and 44, both being extracted in the same manner as mentioned above for the time surface slice. Dip direction information is not present as it is in the time surface slice (FIG. 3A) because the shading does not represent time. The differential shading 65 in an amplitude surface slice represents variations of some measured attribute of the horizon such as seismic amplitude.

The above descriptions, associated with a vertical sampled seismic data volume, also apply to a data volume which is a continuous function of its dimensions. The data is still viewed on some plane and a particular thickness is chosen for building the surface slices. The resulting surface slices have boundaries, as with the time surface slices and the amplitude surface slices, which boundaries occur at constant times, between areas in which the type of event does and does not exist within the chosen slice. The tangent to these boundaries provides strike information, and the width (perpendicular to the local strike) provides the dip magnitude, as explained above with respect to the time surface slices. The dip direction is determined from the depiction of the variations in position of the event within the thickness of the slice. Basically, continuous data must be sampled at some level in order to be manipulated and displayed using current computer and display technology. Continuous data, therefore, always reduces to the sampled case, but with extremely fine sample rate as compared to the average sample rate of vertically sampled seismic data.

Figure 5A:
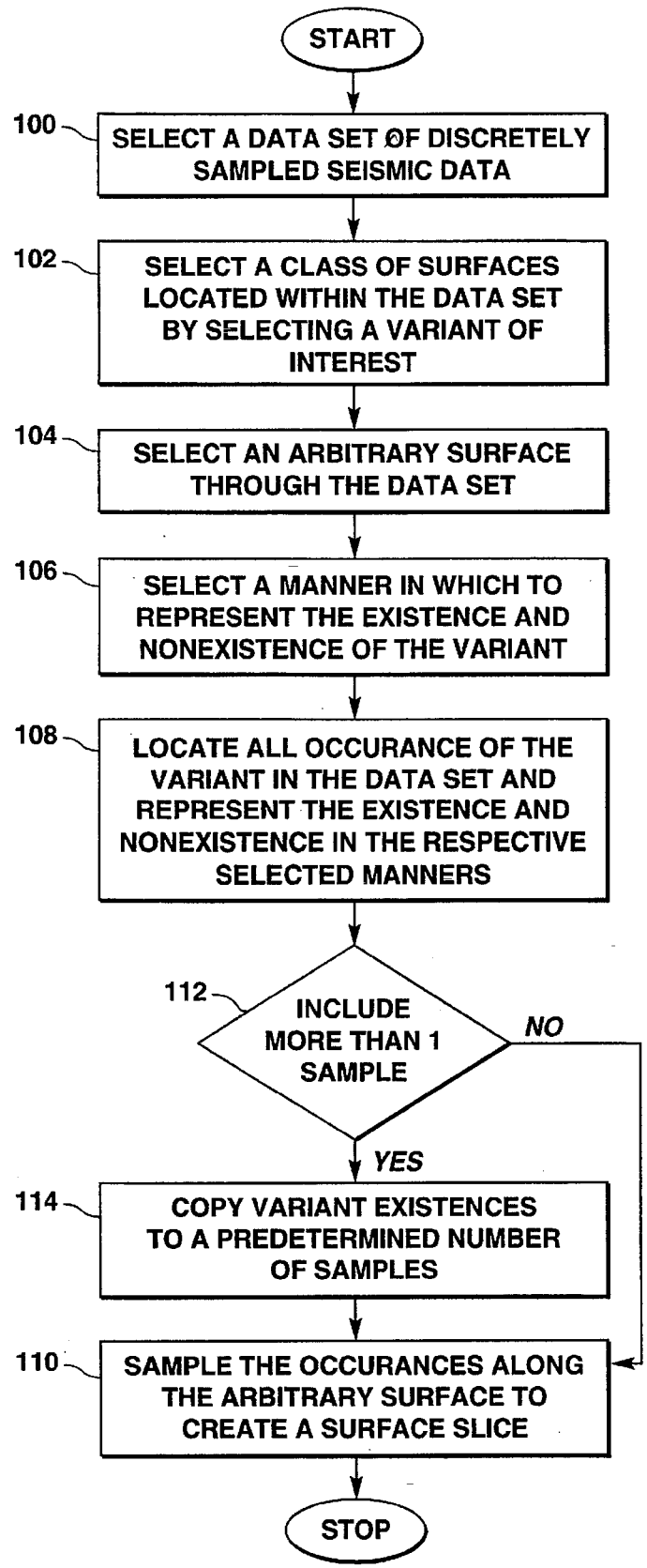
Figure 5B:
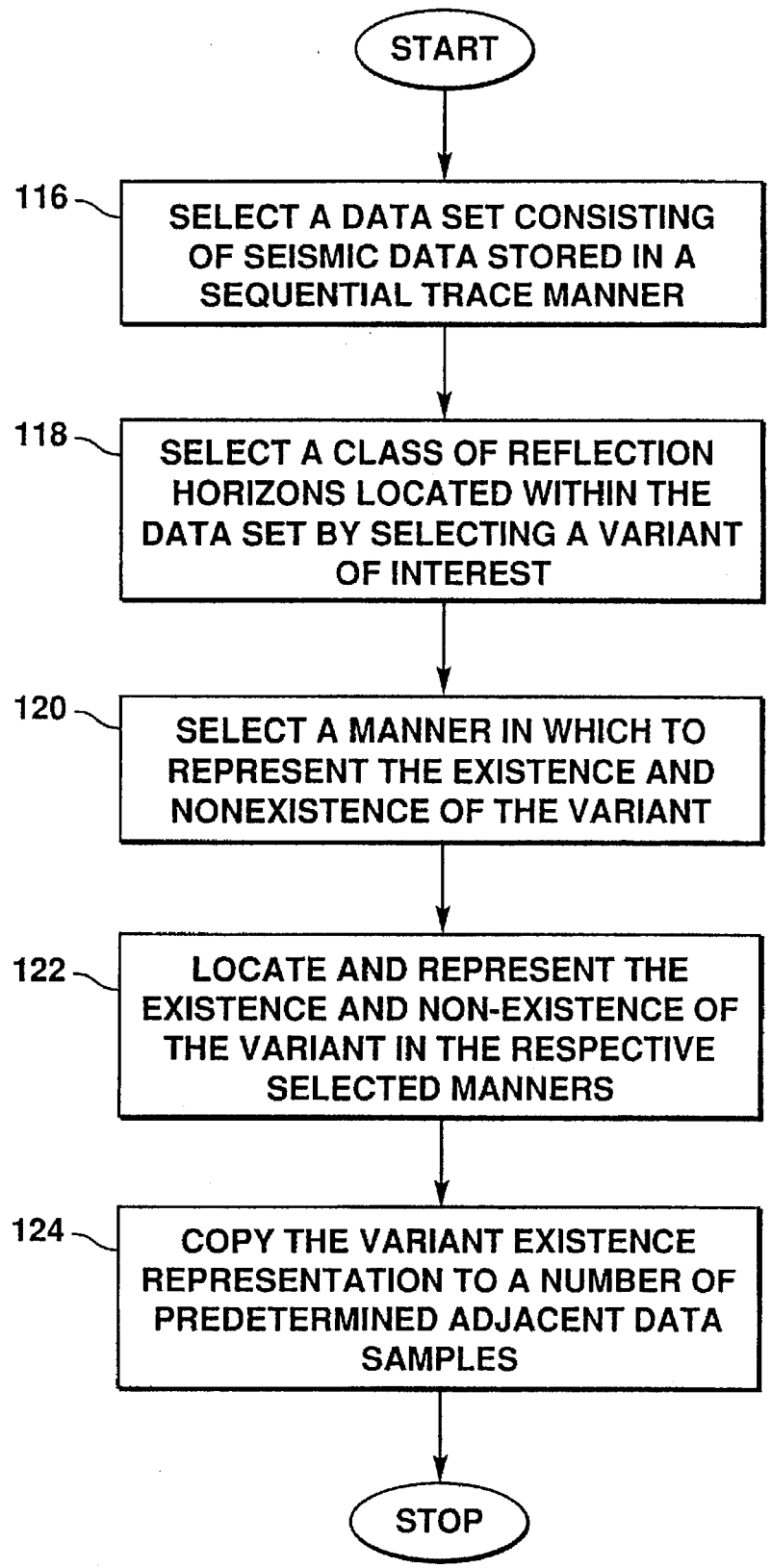
Figure 5C:
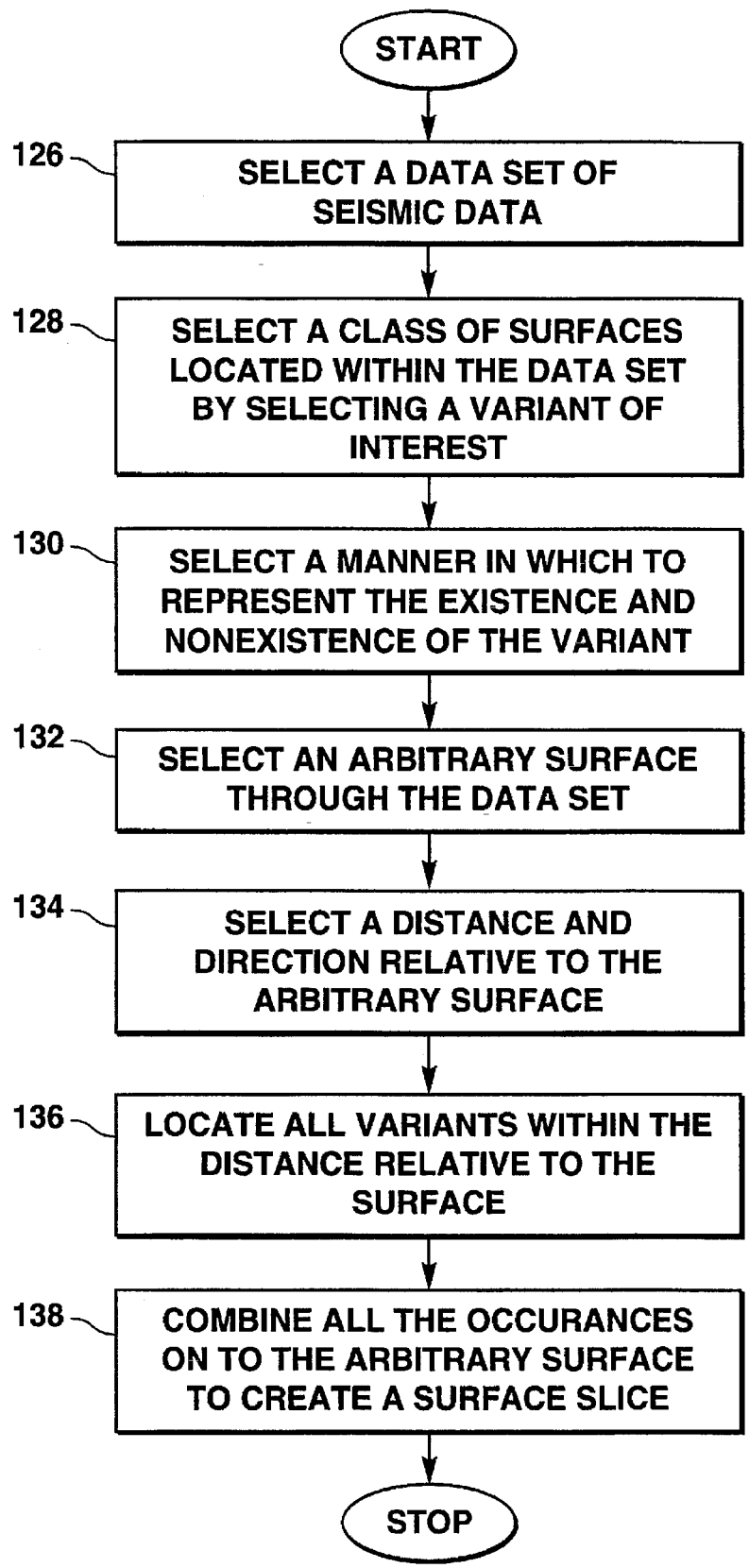

There are three embodiments of the invention which represent three ways to generate a surface slice. FIGS. 5A, 5B, and 5C show three block diagrams corresponding to three processes for generating a surface slice.

FIG. 5A contains a block diagram that illustrates the generation of a surface slice for an N-dimensional data set of discretely sampled data. This process can be used to reduce any N-dimensional data to a local N-1 dimensional representation of that data, or the so-called "surface slice".

Surface slices are particularly useful in analyzing three-dimensional seismic data. Therefore, it may be assumed for the purposes of the description herein that the three-dimensional data set consists of several seismic traces arranged in a volume that is ordered relative to its geographical position and two-way travel time. A seismic trace has a constant geographical position and variations in the two-way travel time.

Step 100 in this process requires the selection of a data set such as a three-dimensional seismic data set. Seismic data, by its nature, will contain many dipping surfaces throughout the volume. FIG. 2 is an example of seismic data having dipping events 34 throughout the volume.

Figure 6:
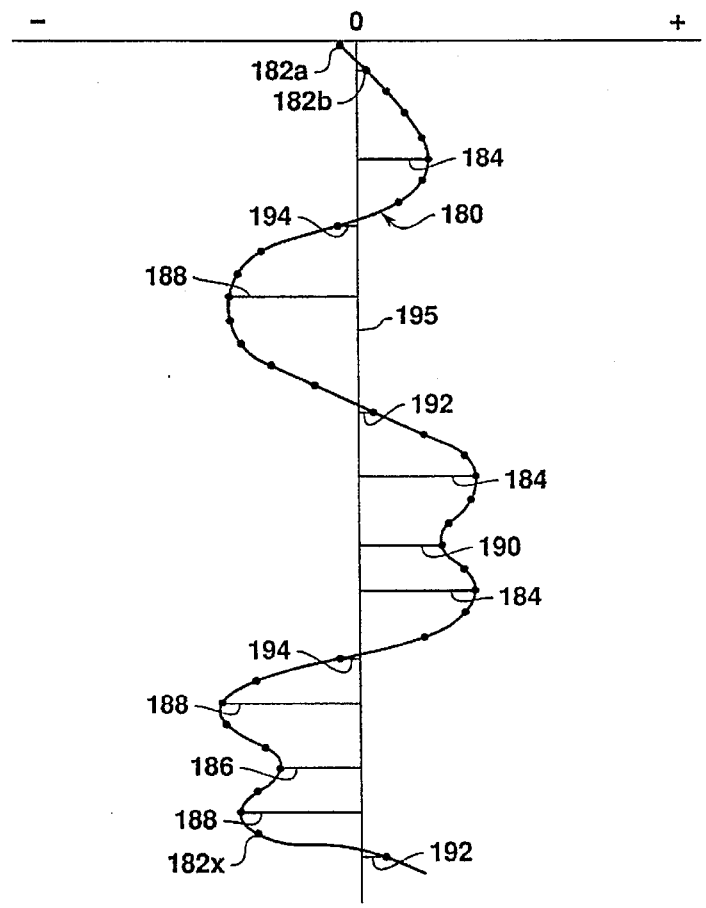

FIG. 6 shows an example of a portion of an individual seismic trace, generally referred to as 180. A collection of many such seismic traces representing numerous measurements from the subsurface in the x and y directions is shown in FIG. 2. The trace is sampled at a constant rate. Sample points 182, 182b, ... 182x represent the positions at which the trace is sampled. The total number of sample points is proportional to the sample rate and the length of the trace. The axial distance between sample points 182a and 182b represents the rate at which the trace 180 is sampled. The seismic amplitude at each sample point is represented by the distance from the axis 195 to that sample point.

Step 102 of FIG. 5a requires the selection of a data variant which then determines the class of surface slices generated. Some variants, such as those shown in the FIG. 6, represent surfaces of constant phase. Such surfaces include peaks 184, local peaks 184 and 186, troughs 188, local troughs 188 190, plus-to-minus zero crossings 192, and minus-to-plus zero crossings 194. Each class of surface slice contains different types of surface slices. The type of surface slice depends on the information sought.

Referring back to FIG. 5A, once the variant and thus the class of surfaces are selected, step 104 requires the selection of an arbitrary, but known, surface that extends through the data volume. Typically when analyzing seismic data the arbitrary surface is a horizontal cut representative of a constant arrival time. Yet, there is no requirement that the arbitrary surface be planer. For instance, this arbitrary surface may be an already interpreted seismic reflection horizon or some complex geometric shape.

Once the arbitrary surface is selected, then step 106 requires the selection of a manner in which to represent the existence and the non-existence of the variant.

Figure 7:
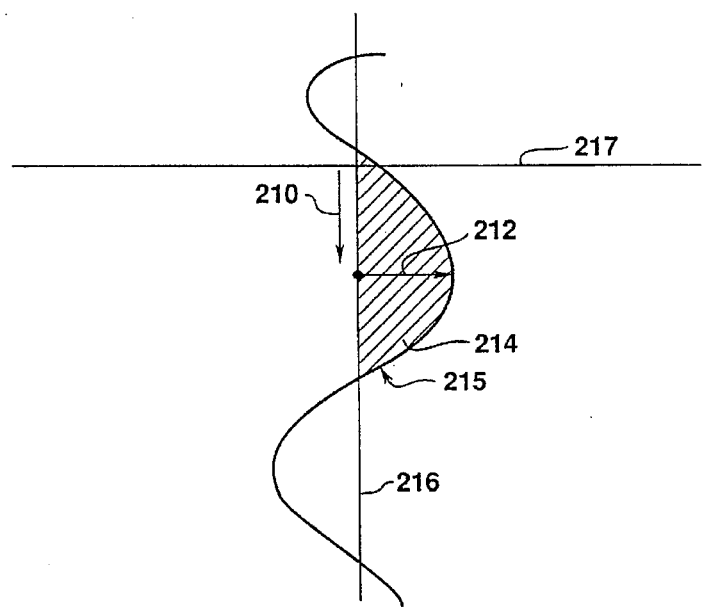

There are two generic types of surface slices, amplitude surface slices and time surface slices. A time surface slice is one in which the variant is represented by its location within the data volume. The location of interest in most cases is either determined by its two-way travel time or its sample number. Another method of identifying the location of interest as illustrated in FIG. 7, is by the distance 210 of the variant from an arbitrary surface 217.

All other representations of the variant are special types of amplitude surface slices. The most common amplitude surface slice is one in which the seismic amplitude is used to represent the variant existence. This is illustrated by line 212 in FIG. 7. However, there are many other ways to represent the variant. For example, the variant may be depicted by the area under the curve 214 as defined by the trace 215 and the axis 216. There are other trace characteristics that can be calculated by those skilled in the art and referred to as the variant existence.

The non-existence of a variant is represented by a "no-event" value. The optimum choice on the no-event value depends upon how the variant existence is represented. For emphasis of the data representing the existence of the variant, the non-existence of the variant can be represented in a contrasting manner. For example, a no-event value of zero, or any negative number works well for most all time surface slices and positive-amplitude, amplitude surface slices.

The next step in the process, step 108, is to identify all occurrences of the existence and non-existence of the variant in the original data set and represent them in the preselected manner. This may involve the creation of a new data set. Interpolation can be used to determine the variant existent locations and values that occur between the sample points.

The final step in creating a single surface slice, step 110, is to sample the new data set along the selected arbitrary surface to create a surface slice. If this is the first time the arbitrary surface is required to be considered, then step 104 can be delayed until after either step 106 or step 108. However, if the variant existence is represented relative to the arbitrary surface, then step 104 must precede step 108.

The generic type of the resulting surface slice is determined by the manner in which the variant is represented. For instance, if the variant is represented by its position in time the resulting surface slice is a time surface slice with a single time contour. In FIG. 3a, time contour 46 represents a single time contour.

Should a user want more information than that which is provided in a single time sample, two methods of achieving this are available. The methods differ in how the information from adjacent time samples is placed onto a single surface slice.

The first method involves using this embodiment of the invention to generate a plurality of successively adjacent surface slices from a plurality of similarly configured arbitrary surfaces that are separated by one data sample. Once these surface slices have been generated, several adjacent surface slices are combined into a single "thick" surface slice. The thickness of the new surface slice is proportional to the number of original surface slices combined into it.

The adjacent arbitrary surfaces can be defined in several different ways. There are two ways that are particularly useful. The first is to define arbitrary surfaces that are separated by one data sample as measured parallel to one of the data dimensions. The vertical data dimension generally proves most useful. The second manner is to define arbitrary surfaces that are separated by one unit distance as measured perpendicular to the arbitrary surface.

Figure 8:
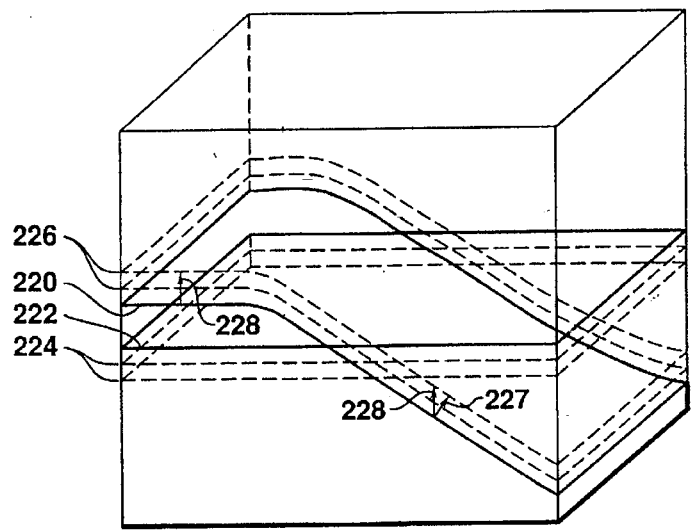

FIG. 8 shows a three-dimensional data set with a dipping horizon 220 located within the volume. Typically in the case of seismic data, with the original arbitrary surface being a horizontal planar cut representative of a constant arrival time 222, adjacent arbitrary surfaces 224 are measured parallel to the data dimension (which is also perpendicular to the surface). However, had the selected arbitrary surface been the actual horizon 220, then the adjacent arbitrary surfaces could be measured either perpendicular to the surface 227, as represented by the adjacent arbitrary surfaces 226, or parallel to the vertical dimension 228. (Note FIG. 8 shows a single surface connecting both arrows 227 and 228. This is for display simplicity only. The actual surfaces are slightly different, but cannot easily be depicted in these drawings.) In most cases, the adjacent surfaces are measured parallel to the vertical data dimensions.

It is important to wisely choose the number of original surface slices to combine into thicker surface slices. The product of the number of original surface slices and the data sample rate determines the "thickness" of the surface slice. In order to generate useful results, this thickness should be less than either the dominant period of the data set or the local data period, where these periods are measured in the direction in which the additional surfaces are considered adjacent.

The number of original surface slices is generally in the range of 1 to 15. The number of adjacent slices, and therefore the thickness, can be constant over the data set or vary as a function of the data dimensions. A constant thickness is typical.

With respect to positions relative to the original arbitrary surface, the additional surfaces can either be centered about or located above or below the original arbitrary surface.

Event overlaps occur at the locations where there exists two or more occurrences of the selected variant within the thickness of the slice. Depending upon how the original surface slices are combined to form the new surface slice, event overlaps can result in the misrepresentation of the particular occurrences of the selected variant. Therefore, when the new surface slice is created, it should be scanned to detect event overlaps and to identify or correct any associated misrepresentations of a variant's existence.

The second method for including information from more than just one time sample, is initiated by saying "yes" in step 112 of FIG. 5A. As part of saying "yes", the number of samples to combine, and therefore the thickness of the desired surface slices, must be established.

The number of adjacent data samples to combine is generally in the range of 1 to 15. Choosing a value of 1 is identical to saying "no" in step 112 of FIG. 5A. The best choice of the number of adjacent data samples follows the same logic just used in the first method. For best results, the number of samples to combine should be less than the number of samples in the local data period.

The next step, step 114, is the step that combines the data from the established number of data samples. This is accomplished by copying the variant existence representation to the predetermined number of adjacent data samples prior to the sampling along the arbitrary surface.

The combining step can be accomplished in many ways. One way that works well is to convolve the data with a simple filter. In this simple filter, all of the coefficients equal one and the number of coefficients equals the number of samples that are combined. The filter lag can be either positive or negative, but its magnitude is normally less than or equal to its length.

The effect of the combining step is to spread information from one sample to adjacent samples. After step 110 is executed, the surface slice will contain information from several samples due to the combining step. This information may come from either above, below, or both above and below, the arbitrary surface. Where it comes from is determined by how the data are combined. In the instance where the filter is used to perform the combining, the lag value determines from where the extra information comes.

An optional step in the process is to apply static shifts to the data volume, to flatten a preselected arbitrary surface. The arbitrary surface is called a datum. These shifts can be applied either before or after the combining step 114. The preselected arbitrary surface can be a horizontal cut representing a constant arrival time, a previously interpreted seismic reflection horizon, or a geometric surface.

The application of the static shift is potentially a very powerful tool. Assume the arbitrary surface is a particular, previously interpreted, seismic reflection horizon. The surface slice taken at the datum will contain information of the chosen variant at the location of the horizon. In many areas seismic horizons are generally parallel. Therefore, surface slices which are close to the datum will generally only contain information on a single horizon. The number of surface slices that an approximately parallel horizon will be contained in is directly related to the thickness of the surface slices and the differential dip between the adjacent and datumed horizons.

The following describes the actual working embodiment of the invention presently employed. It is also the best mode of the invention that has been actually reduced to practice. This embodiment is specifically directed to generating a local two-dimensional representation of a preselected class of seismic reflection horizons from three-dimensional seismic data that is initially organized in a vertical sequential trace manner. Although this embodiment is specifically directed to seismic data, it is applicable to any type of N-dimensional data organized in a vertical sequential manner. FIG. 5B shows the flow diagram for this process.

First, step 116 directs a user to select a data set consisting of seismic data stored in a vertical sequential trace manner. The seismic data can be either stacked three-dimensional seismic data or prestacked seismic data which is treated as seismic data of three dimensions.

Step 118 requires the selection of a class of reflection horizons by selecting a variant from the seismic data. Again, most variants can be thought of as surfaces of constant phase. FIG. 6 shows a representation of a typical vertical seismic trace. Examples of variants which are surfaces of constant phase are peaks 184, local peaks 186, troughs 188, local troughs 190, plus-to-minus zero crossing 192, and minus-to-plus zero crossings 194.

Once a variant has been selected, the specific manner in which to represent the variant must also be selected, step 120. The existence and non-existence of a variant can be represented in many different ways. Each different way produces a different special type of surface slice. For instance, refer to FIG. 7 where the variant is a peak. Such peak can be represented by either its amplitude 212, location in time or sample number, distance 210 from any known arbitrary surface 217, area underneath the curve 214, or by any predetermined value which can be multiplied by a gain function to represent the position of the variant within the data volume.

When the variant existence is represented in some manner by its location, such as its value in two-way travel time, the resulting surface slice contains quantitative information on the local dip direction of the horizon. If the variant is represented by a predetermined value, for instance one, it can be multiplied by a gain function to represent the variant existence as a function of its position within the data volume. This will also provide quantitative information on the local dip direction of the horizon.

In order to distinguish between variant existence and variant non-existence, the variant non-existence can be represented by a predetermined value. The predetermined value should not be a value used to represent the various existences of the variants. Zero is sometimes a convenient value to represent the non-existence of a variant at a particular sample point. If variants are located between samples then their existence can be determined by interpolation.

The fourth step, step 122 in the process, is to identify all occurences of the existence and non-existence of the variant in the original data set and represent them in the preselected manner. This step can be done on all data at once to create a new data set, or one trace at a time.

The final step 124 of the process involves copying the variant existent representation to a number of predetermined adjacent data samples. The number of adjacent data samples should be less than the number of samples in the local period of the data. One way to perform the copying function includes convolving the data with a filter as described in the previous embodiment.

An optional step in the process is to apply static shifts to the data volume, to flatten a preselected arbitrary surface. This is done in the same manner as described in the first embodiment of this invention.

Once the copying step is completed the data incorporates a local two-dimensional representation of the preselected class of seismic reflection horizons. At this point the data are still arranged in a vertical sequential trace manner. To facilitate displaying or interpreting the data, such data can be resorted from this vertical format into a horizontal data format by mathematical manipulations known to those skilled in the art. In such case, a horizontal plane at any constant arrival time of interest contains sufficient information to be a surface slice.

A third embodiment of the invention is a process for generating local N-1 dimensional representations of a preselected class of surfaces from an N-dimensional data set of conventional data, such data being either continuous or discrete. FIG. 5c shows the block diagram for this corresponding process. Although this embodiment can be used in analyzing any N-dimensional data, for purposes for illustration, the discussion is limited to the processing of three-dimensional data.

This embodiment differs from the other two embodiments in that once a data set is chosen, an arbitrary surface through that data set is selected, and all occurrences of a preselected variant within a certain distance from that arbitrary surface are then combined onto the arbitrary surface. In the other embodiments all of the data in the data set is searched to locate the existence of the variants. Then the surface slices are generated by the respective processes as described earlier.

Referring to FIG. 5C, step 126 requires the user to select a data set of interest. Either continuous data or discretely sampled data can be used.

Step 128 next directs the user to select a class of surfaces by selecting a variant from the data. The variant is selected from, but is not limited to, the group consisting of peaks, local peaks, troughs, local troughs, plus-to-minus zero crossings, and minus-to-plus zero crossings. Once the variant and thus the class of surfaces is selected, then a manner in which to represent the existence and the non-existence of the variant must be selected, step 130. This is done by the same procedure as indicated for the other embodiments.

The next step in the process, step 132, is to select an arbitrary surface through the data set. The arbitrary surface can be any planar surface, including a surface represented by the constant value of one of the dimensions, or a non-planar surface. When the data consists of three-dimensional seismic data, the surface can be a horizontal cut representative of a constant arrival time or the surface can be a seismic reflection horizon.

Figure 9:
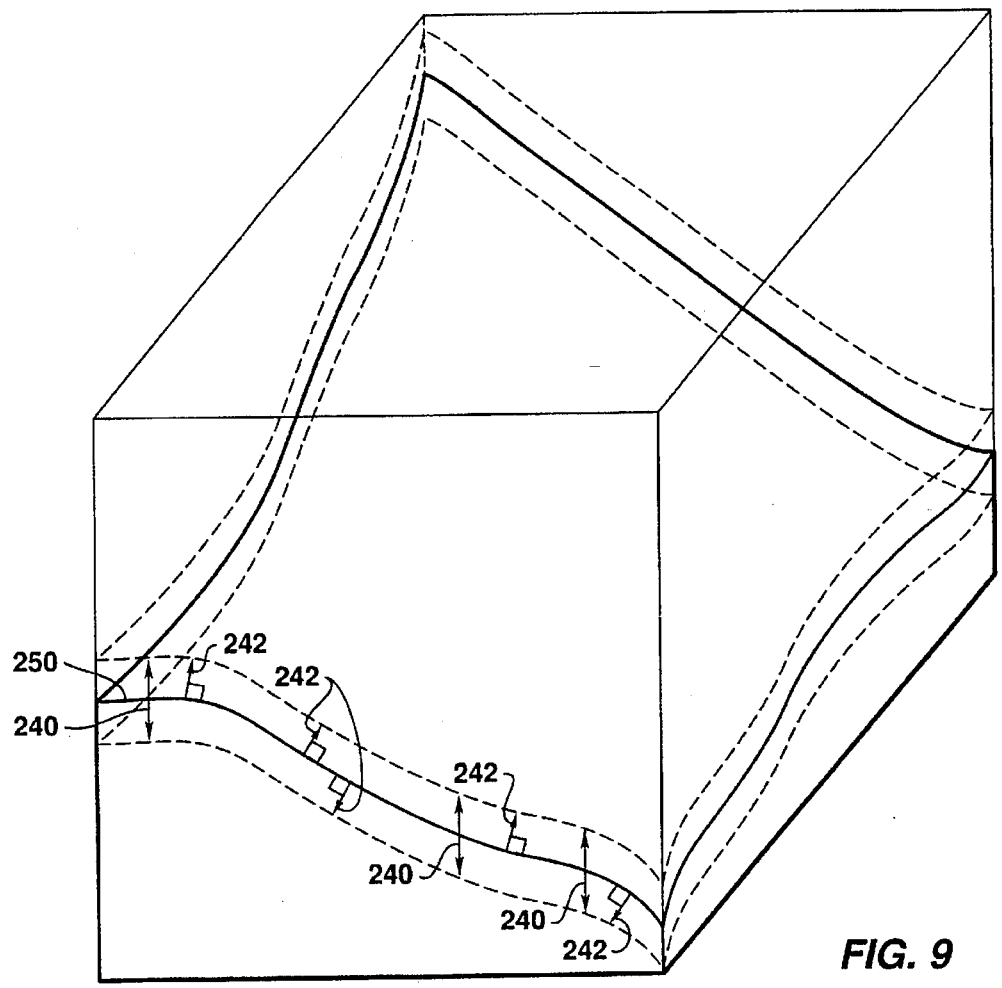

Step 134 requires the selection of a distance and direction relative to the selected arbitrary surface. The distance can be measured in a direction that is parallel to one of the data dimensions, as indicated in FIG. 9 by arrows 240 assuming an arbitrary surface 250. If the arbitrary surface is non-planar, such as surface 250, the distance may also be measured in a direction perpendicular to the arbitrary surface, as shown by arrows 242. (Note, FIG. 9 shows a single surface connecting both arrows 240 and 242. This is for display simplicity only. The actual surfaces are slightly different, but cannot easily be depicted in these drawings.) The distance can be measured above, below, or about the arbitrary surface. The value of the distance can be constant over the data set or vary as a function of the data dimensions. The value of the distance should be less than the dominant period of the data set or the local data period, both being measured in the same direction as the arbitrary distance.

Finally, referring back to FIG. 5C, the surface slice is generated by locating all occurences of the variant within the specified distance relative to the arbitrary surface, as specified in step 136, and combining all the occurrences of the variants onto the arbitrary surface, as specified in step 138. The non-existence of the variant is represented by a predetermined value, such as zero, which contrasts with the representation of the variant existence.

Should the user want more information than that which is provided within the original selected distance, two methods are available. First, the method described in FIG. 5C, can be repeated only using a greater distance away from the arbitrary surface. Alternatively, a plurality of similarly configured arbitrary surfaces, separated by a preselected distance are generated and combined into a new surface slice. Such new surface slice representative of N number of surface slices is the same as a single surface slice that uses an arbitrary distance that is N times larger than that used to generate the individual slices of the original surface slice.

Figure 10A:
Figure 10B:

Regardless of the embodiment used, a surface slice is generated. FIG. 10A shows an actual time surface slice and FIG. 10B shows an actual amplitude surface. These surface slices were generated from the same seismic data volume using the second embodiment process set forth above. Such surface slices allow an interpreter to interpret seismic horizons in a more accurate and timely process than that available in the prior art.

In addition, the information can be graphically displayed to depict the existence of the variants with respectively darker shading, such as those seen in FIGS. 10A and 10B, or the information may be depicted by different colors.

While several embodiments have been described and illustrated it will be understood that the invention is not limited thereto, since many modifications may be made and will become apparent to those skilled in the art.

What is claimed is:

1. A process for generating local N-1 dimensional representations of a class of surfaces in an N-dimensional data set wherein N represents the number of data dimensions and N is a positive integer greater than two, which comprises selecting a class of surfaces by selecting a variant, wherein said variant is any identifiable and isolatable attribute of the data which forms a surface of some finite extent throughout the data volume, selecting an arbitrary surface through the N-dimensional data set, selecting a manner in which to represent the existence and non-existence of said variant, locating the existence of, and representing in said manner, all occurrences of said variant within the N-dimensional data set, and sampling said occurrences relative to said arbitrary surface to create one surface slice by representing the existence of said occurrences, relative to said arbitrary surface, in said manner to thereby generate the local N-1 dimensional representation of the class of surfaces of the N-dimensional data set on the surface slice.

2. The process in accordance with claim 1, and including the additional step of applying static shifts to the N-dimensional data set to flatten a datum through the N-dimensional data set.

3. The process in accordance with claim 1, wherein the N-dimensional data set is comprised of three-dimensional seismic data.

4. The process in accordance with claim 3, wherein said arbitrary surface is a horizontal cut representative of a constant arrival time.

5. The process in accordance with claim wherein said arbitrary surface is a seismic reflection horizon.

6. The process in accordance with claim 1, wherein the N-dimensional data set is comprised of three-dimensional pre-stacked seismic data.

7. The process in accordance with claim 1, wherein said variant is selected from the group consisting of peaks, local peaks, troughs, local troughs, plus-to-minus zero crossings, and minus-to-plus zero crossings.

8. The process in accordance with claim 1, wherein said variant is a constant value of instantaneous phase.

9. The process in accordance with claim 1, wherein said arbitrary surface is a non-planar surface.

10. The process in accordance with claim 1, wherein said arbitrary surface is a planar surface.

11. The process in accordance with claim 10, wherein said planar surface is represented by a constant value in one dimension of the N-dimensional data set.

12. The process in accordance with claim 1, wherein said occurrences of said variant are represented by the amplitudes of said variant.

13. The process in accordance with claim 1, wherein said occurrences of said variant are represented by the locations of said variant.

14. The process in accordance with claim 13, wherein said representation of said variant existence contains information on local dip direction of said class of surfaces.

15. The process in accordance with claim 1, wherein said occurrences of said variant are represented by the distance of said variant from said arbitrary surface.

16. The process in accordance with claim 1, wherein said occurrences of said variant are represented by a value.

17. The process in accordance with claim 16, wherein said value is 1.

18. The process in accordance with claim 17, and including the step of multiplying said occurrences of said variant by a gain function to represent said occurrences as a function of the position of each of said occurrences within the N-dimensional data set.

19. The process in accordance with claim 1, wherein the non-existence of said variant is represented by a value.

20. The process in accordance with claim 1, wherein said occurrences of said variant contains information on local dip magnitudes and local strikes of the class of surfaces.

21. The process in accordance with claim 1, wherein local widths of said occurrences of said variant represents local dip magnitudes of said class of surfaces.

22. The process in accordance with claim 1, wherein local tangents to said occurrences of said variant represent local strike directions of said class of surfaces.

23. The process in accordance with claim 1, wherein the N-dimensional data set is discretely sampled.

24. The process in accordance with claim 23, wherein said occurrences of said variant are determined between sample points by interpolation.

25. The process in accordance with claim 23 wherein discrete samples are taken at a constant sample rate in at least one dimension.

26. The process in accordance with claim 25, and including the additional steps of
selecting a number of additional arbitrary surfaces,
generating successively adjacent additional surface slices at each of said additional arbitrary surfaces, and
combining into a new surface slice said adjacent surface slices.

27. The process in accordance with claim 26, wherein said successively adjacent additional arbitrary surfaces are located essentially parallel to one of the data dimensions.

28. The process in accordance with claim 26, wherein said successively adjacent additional arbitrary surface are located essentially perpendicular to said arbitrary surface.

29. The process in accordance with claim 26, wherein said number when multiplied by said sample rate is less than a dominant period of the N-dimensional data set as measured in the direction in which said additional surfaces are considered adjacent.

30. The process in accordance with claim 26, wherein said number when multiplied by said sample rate is less than a local data period measured in the direction in which said successively adjacent additional surfaces are considered adjacent.

31. The process in accordance with claim 26, wherein said number is constant over the N-dimensional data set.

32. The process in accordance with claim 26, wherein said number varies as a function of the data dimensions.

33. The process in accordance with claim 26, wherein said successively adjacent additional surface slices are centered about said arbitrary surface.

34. The process in accordance with claim 26, wherein said successively adjacent additional surface slices are above said arbitrary surface.

35. The process in accordance with claim 26, wherein said successively adjacent additional surface slices are below said arbitrary surface.

36. The process in accordance with claim 26, and including scanning said new surface slice for variant overlaps to identify associated misrepresentation of said class of surfaces.

37. The process in accordance with claim 25, and including the additional step of copying said occurrences of said variant to a number of adjacent data samples prior to sampling along said arbitrary surface to create said surface slice.

38. The process in accordance with claim 37, wherein said number of adjacent data samples is dependent on said sample rate and a local period.

39. The process in accordance with claim 37, wherein said number of adjacent data samples is dependent on said sample rate and a dominant period.

40. The process in accordance with claim 37, wherein said copying includes convolving with a filter having coefficients.

41. The process in accordance with claim 40, wherein said coefficients are equal to 1.

42. The process in accordance with claim 40, wherein said filter has a length which is chosen from the range of 1 to 15 samples.

43. The process in accordance with claim 42, wherein lag value of said filter is chosen from the range of negative said filter length to positive said filter length.

44. The process in accordance with claim 1, and including graphically displaying said surface slice.

45. The process in accordance with claim 1, wherein occurrences of said variant are graphically differently depicted with different shadings.

46. The process in accordance with claim 1, wherein the occurrences of said variant are graphically differently depicted with different colors.

47. A process for generating local N-1 dimensional representations of a class of surfaces in an N-dimensional data set, wherein N represents the number of data dimensions and N is a positive integer greater than two, which comprises selecting the class of surfaces by selecting a variant, wherein said variant is any identifiable and isolatable attribute of the data which forms a surface of some finite extent throughout the data volume, selecting a manner in which to represent the existence and non-existence of said variant, locating the existence of and representing in said manner all occurrences of said variant within the N-dimensional data set, selecting a number of adjacent data samples, and copying said occurrences of said variant to said number of adjacent data samples to generate the local N-1 dimensional representation of the class of surfaces.

48. The process in accordance with claim 47, wherein the N-dimensional data set is comprised of seismic data.

49. The process in accordance with claim 47, wherein the N-dimensional data set is comprised of pre-stacked seismic data which is treated as seismic data of three dimensions.

50. The process in accordance with claim 47, and including the step of resorting the N-dimensional data set stored in a vertical sequential manner into data stored in a horizontal manner for subsequent display and interpretation.

51. The process in accordance with claim 47, and including the step of taking a horizontal cut through the N-dimensional data set to generate a surface slice.

52. The process in accordance with claim 51, wherein said occurrences of said variant on said surface slice contains quantitative information on the local dip magnitudes and local strike directions of the class of surfaces.

53. The process in accordance with claim 51, wherein local width of said occurrences of said variant on said surface slice represents local dip magnitudes of said class of surfaces.

54. The process in accordance with claim 51, wherein local tangent to said occurrences of said variant on said surface slice represents local strike directions of said class of surfaces.

55. The process in accordance with claim 51, and including graphically displaying said surface slice.

56. The process in accordance with claim 51, wherein said occurrences of said variant are graphically differently depicted with different shadings.

57. The process in accordance with claim 51, wherein said occurrences of said variant are graphically differently depicted with different colors.

58. The process in accordance with claim 47, wherein said number of adjacent data samples is dependent on sample rate and a dominant period of the N-dimensional data set.

59. The process in accordance with claim 47, wherein said copying includes convolving with a filter having coefficients.

60. The process in accordance with claim 59, wherein said coefficients are equal to 1.

61. The process in accordance with claim 59, wherein said filter has a length which is chosen from the range of 1 to 15 samples.

62. The process in accordance with claim 47, and including the additional step of applying static shifts to the data volume to flatten a datum through the N-dimensional data set.

63. The process in accordance with claim 62, wherein said datum is a seismic reflection horizon.

64. The process in accordance with claim 47, and including scanning the local N-1 dimensional representation of the class of surfaces for variant overlaps to identify associated misrepresentations of said class of surfaces.

65. The process in accordance with claim 47, wherein said variant is selected from the group consisting of peaks, local peaks, troughs, local troughs, plus-to-minus zero crossings, and minus-to-plus zero crossings.

66. The process in accordance with claim 47, wherein said variant is a constant value of instantaneous phase.

67. The process in accordance with claim 47, wherein said occurrences of said variant are represented by the amplitudes of said variant.

68. The process in accordance with claim 47, wherein said occurrences of said variant are represented by the locations of said variant.

69. The process in accordance with claim 68, wherein said occurrences of the said variant existence contain quantitative information on local dip directions of said class of surfaces.

70. The process in accordance with claim 47, wherein said occurrences of said variant are represented by a value.

71. The process in accordance with claim 70, wherein said value is 1.

72. The process in accordance with claim 71, and including the step of multiplying said occurrences of said variant by a gain function to represent said occurrences as a function of the position of each of said occurrences within the N-dimensional data set.

73. The process in accordance with claim 47, wherein the non-existence of said variant is represented by a value.

74. A process for generating local N-1 dimensional representations of a class of surfaces in an N-dimensional data set wherein N represents the number of data dimensions and N is a positive integer greater than two, which comprises selecting the class of surfaces by selecting a variant, wherein said variant is any identifiable and isolatable attribute of the data which forms a surface of some finite extent throughout the data volume, selecting a arbitrary surface through the N-dimensional data set, selecting a arbitrary distance relative to the arbitrary surface, selecting a manner in which to represent the existence and non-existence of said variant, locating all occurrences of said variant within said distance relative to said arbitrary surface, and combining said occurrences into one surface slice by representing said occurrences in said manner to thereby generate the local N-1 dimensional representation of the class of surfaces of the N-dimensional data set.

75. The process in accordance with claim 74, wherein the N-dimensional data set is continuous.

76. The process in accordance with claim 74, wherein the N-dimensional data set is discretely sampled.

77. The process in accordance with claim 76, wherein determining variant existence at sample points sets said arbitrary distance to ±½ sample.

78. The process in accordance with claim 74, wherein said occurrences of said variant are represented by a value.

79. The process in accordance with claim 78, wherein said value is 1.

80. The process in accordance with claim 79, wherein said arbitrary surface is located adjacent to a plurality of similarly configured arbitrary surfaces, and wherein said value is multiplied by a gain function to thereby represent said occurrences of said variant as a function of said variant position relative to said variant on other adjacent arbitrary surfaces.

81. The process in accordance with claim 74, wherein said arbitrary surface is located adjacent to a plurality of similarly configured arbitrary surfaces which are separated by said arbitrary distance, and including the additional steps of generating a plurality of successively adjacent additional surface slices at each of said respective arbitrary surfaces, and combining into a new surface slice a said plurality of successively adjacent surface slices.

* * * * *